(12) United States Patent
Wu et al.

(10) Patent No.: US 8,725,478 B2
(45) Date of Patent: May 13, 2014

(54) RESERVOIR UPSCALING METHOD WITH PRESERVED TRANSMISSIBILITY

(75) Inventors: Jianbing Wu, Anchorage, AK (US); Patrick Wong, Houston, TX (US); Chao Dong, Guangdong (CN)

(73) Assignee: ConocoPhillips Company, Houston, TX (US)

( * ) Notice: Subject to any disclaimer, the term of this patent is extended or adjusted under 35 U.S.C. 154(b) by 227 days.

(21) Appl. No.: 13/192,030

(22) Filed: Jul. 27, 2011

(65) Prior Publication Data

US 2012/0035896 A1     Feb. 9, 2012

Related U.S. Application Data

(60) Provisional application No. 61/371,816, filed on Aug. 9, 2010.

(51) Int. Cl.
G06F 7/60     (2006.01)
G06G 7/48     (2006.01)

(52) U.S. Cl.
USPC .............................................. 703/10; 703/2

(58) Field of Classification Search
None
See application file for complete search history.

(56) References Cited

U.S. PATENT DOCUMENTS

| | | | |
|---|---|---|---|
| 5,706,194 A | 1/1998 | Neff et al. | |
| 5,757,663 A | 5/1998 | Lo et al. | |
| 6,023,656 A | 2/2000 | Cacas et al. | |
| 6,106,561 A * | 8/2000 | Farmer | 703/10 |
| 6,662,109 B2 | 12/2003 | Roggero et al. | |
| 6,810,370 B1 * | 10/2004 | Watts, III | 703/10 |
| 6,823,297 B2 | 11/2004 | Jenny et al. | |
| 6,826,520 B1 * | 11/2004 | Khan et al. | 703/10 |
| 7,191,071 B2 | 3/2007 | Kfoury et al. | |
| 7,526,418 B2 * | 4/2009 | Pita et al. | 703/10 |
| 7,558,715 B2 | 7/2009 | Schaaf et al. | |
| 7,584,086 B2 | 9/2009 | Frankel | |
| 7,603,265 B2 | 10/2009 | Mainguy et al. | |
| 7,634,395 B2 | 12/2009 | Flandrin et al. | |
| 8,301,429 B2 * | 10/2012 | Hajibeygi et al. | 703/10 |
| 2006/0277012 A1 | 12/2006 | Ricard et al. | |
| 2008/0133192 A1 | 6/2008 | Gallagher et al. | |
| 2008/0208539 A1 | 8/2008 | Lee et al. | |
| 2009/0164187 A1 | 6/2009 | Habashy et al. | |
| 2009/0299714 A1 | 12/2009 | Kelkar et al. | |
| 2009/0306945 A1 | 12/2009 | Wu et al. | |
| 2010/0114544 A1 | 5/2010 | Dogru | |
| 2010/0191516 A1 * | 7/2010 | Benish et al. | 703/10 |

FOREIGN PATENT DOCUMENTS

WO     WO2009108432     9/2009

OTHER PUBLICATIONS

Y. Chen, A Coupled Local-Global Upscaling Approach for Simulating Flow in Highly Heterogeneous Formations, Appearing in Advances in Water Resources, 26: 1041-1060. (2003).

Michael J. King, Upgridding and Upscaling: Current Trends and Future Directions, SPE 2006-2007 Distinguished Lecturer.

(Continued)

*Primary Examiner* — Saif Alhija
*Assistant Examiner* — Nithya J Moll
(74) *Attorney, Agent, or Firm* — ConocoPhillips Company

(57) ABSTRACT

The invention relates to methods for upscaling a three dimensional model. More particularly, but not by way of limitation, embodiments of the present invention includes method for upscaling a three dimensional model by preserving transmissibility.

4 Claims, 5 Drawing Sheets

(56) References Cited

OTHER PUBLICATIONS

Seyyed Abolfazi Hosseini, et al., Analytical Upgridding Method to Preserve Dynamic Flow Behavior, SPEC 116113 (2008).

E.A. Idrobo, et al., A New Tool to Uphold Spatial Reservoir Heterogeneity for Upscaled Models, SPE Latin American and Caribbean Petroleum Engineering Conference, Society of Petroleum Engineers (2003).

Pinggang Zhang, et al., A New Practical Method for Upscaling in Highly Heterogeneous Reservoir Models, SPE Journal, 13: 68-76 (2008).

Jianbing Wu, et al., A New Upscaling Method with Transmissibility Preserved Across Coarse Block Boundaries, ConocoPhillips, WNT. 600575 (Apr. 17, 2009).

PCT/US2011/45539 PCT International Search Report (PCT/ISA/210) dated Dec. 6, 2011.

* cited by examiner

RESERVOIR UPSCALING METHOD WITH PRESERVED TRANSMISSIBILITY

CROSS-REFERENCE TO RELATED APPLICATIONS

This application claims priority benefit under 35 U.S.C. Section 119(e) to U.S. Provisional Patent Ser. No. 61/371,816 filed on Aug. 9, 2010, the entire disclosure of which is incorporated herein by reference.

FIELD OF THE INVENTION

The invention relates to methods for upscaling a three dimensional model. More particularly, but not by way of limitation, embodiments of the present invention includes methods for upscaling a three dimensional model by preserving transmissibility.

BACKGROUND OF THE INVENTION

Geologic models, such as petroleum reservoir geologic models, are often utilized by computer systems for simulations. For example, computer systems may utilize petroleum reservoir geologic models to simulate the flow and location of hydrocarbons within a reservoir. Geologic models are typically formed utilizing millions of three-dimensional elements or "cells," with each cell corresponding to a location and a physical geologic feature. As there is a general correlation between the number of cells a model contains and the simulation accuracy provided by the model, it is generally desirable to form geologic models utilizing as many cells as possible.

Accurate reservoir performance forecasting requires three-dimensional representation of the geologic model. The geologic model is commonly built with the use of well data and stochastic simulation techniques. Simulated rock property values are filled in the three-dimensional cells constructed at a given scale. Cell dimensions are changed according to the needs of flow simulation. The cells can be "upscaled" into larger ("coarser") cells, "downscaled" into smaller ("finer") cells or a combination thereof.

Upscaling is used in reservoir modeling to speed up fluid-flow simulation by reducing the number of simulation cells of high resolution (or fine-scale) reservoir model. A good upscaling method not only preserves reservoir heterogeneity of the fine-scale model, but also maintains the accuracy of flow simulation. Conventional upscaling methods work well when the reservoirs are, or close to, homogeneous. When the reservoirs are highly heterogeneous and/or with complex cell connections, these methods fail to produce acceptable results.

For example, the static-based approach groups the fine cells by minimizing the statistical difference between the fine and coarse models, and then calculates the upscaled properties using analytical averaging methods. The static-based methods are CPU efficient, but may not be able to capture the flow behavior of the fine model. The flow based approach uses a pre-defined coarse framework to calculate the upscaled properties using either single or two phase flow simulations to mimic the flow behavior in the fine model. The flow-based approaches could better capture the dynamic flow behavior, but are CPU inefficient and are strongly dependent on many other dynamic parameter settings, such as well placement and production scenario.

Therefore, a need exists to reduce the simulation errors between the fine and coarse models and to preserve the flow barriers and the detoured fluid-flow paths.

SUMMARY OF THE INVENTION

In an embodiment, a method of preserving transmissibility in any given three-dimensional model, the method comprising: (a) determining an upscaled permeability along an x-axis for the coarse cells; (b) calculating a transmissibility properties along the x-axis for the coarse cells; (c) calculating the transmissibility properties along the x-axis for the fine cells; (d) calculating transmissibility multipliers along the x-axis across the coarse cells, wherein each transmissibility multiplier along the x-axis is calculated by dividing the transmissibility along the x-axis across the fine cells by the transmissibility along the x-axis across the coarse cells; (e) determining the upscaled permeability along a y-axis for the coarse cells; (f) calculating the transmissibility along the y-axis for the coarse cells; (g) calculating the transmissibility along the y-axis across the fine cells; (h) calculating the transmissibility multipliers along the y-axis across the coarse cells, wherein each transmissibility multiplier along the y-axis is calculated by dividing the transmissibility along the y-axis across the fine cells by the transmissibility along the y-axis across the coarse cells; (i) calculating the upscaled permeability properties along a z-axis for the coarse cells, wherein each permeability along the z-axis across the coarse cells is calculated by applying a harmonic averaging over the non-zero permeability cells, wherein harmonic averaged permeability is calculated by dividing the summation of a non-zero thickness by the summation of the non-zero thickness divided by the non-zero permeability along the z-axis across the fine cells; (j) monitoring the transmissibility multiplier along the z-axis across the coarse cells, wherein the presence of a zero permeability value in the fine cell on either side of the boundary of the coarse cells results in a zero transmissibility multiplier along the z-axis across that boundary; (k) calculating the transmissibility along the z-axis across the coarse cells, wherein the transmissibility along the z-axis across the coarse cells is calculated by utilizing the upscaled permeabilities from step (i); (l) identifying successive fine cells connected above and below the boundary shared by two successive coarse cells; (m) calculating the upscaled permeability along the z-axis for the coarse blocks identified in step (l); (n) calculating the transmissibility along the z-axis across the coarse cells using the upscaled permeability calculated in step (m); and (o) calculating the transmissibility multiplier along the z-axis across the coarse cells.

BRIEF DESCRIPTION OF THE DRAWINGS

The invention, together with further advantages thereof, may be understood by reference to the following description taken in conjunction with the accompanying drawings in which.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations that come within the scope of the appended claims and their equivalents.

Figure 1A:
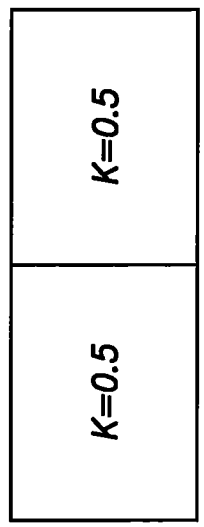
FIG. 1 is a schematic of horizontal permeabilities in fine cells in a Cartesian reservoir grid (plot a) and in the corresponding upscaled coarse cells (plot b) in accordance with an embodiment of the present invention.
Figure 1B:
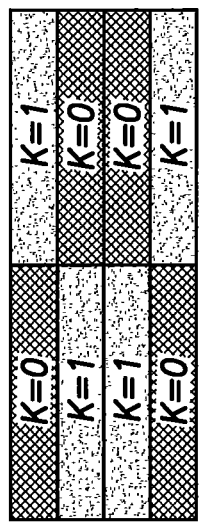
Figure 2A:
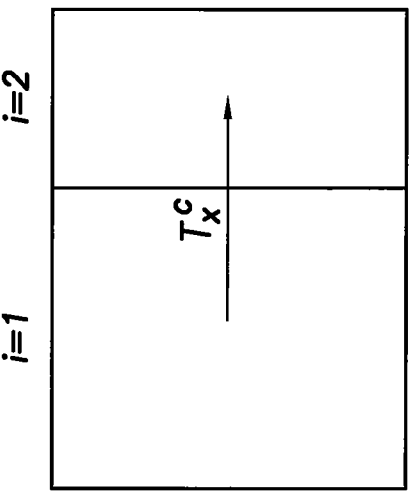
FIG. 2 is a schematic of horizontal transmissibilities in fine cells in a Cartesian reservoir grid (plot a) and in the corresponding upscaled coarse cells using conventional methods (plot b) in accordance with an embodiment of the present invention.
Figure 2B:
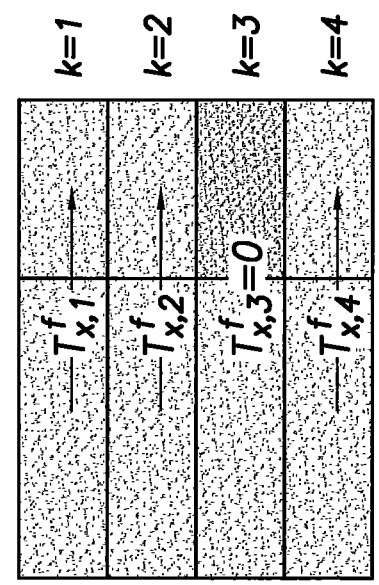

Upscaling methods first generate a low resolution (or coarse-scale) three-dimensional framework, and then calculate the reservoir properties, for instance permeability and porosity, at each cell. For complex connections, the upscaled properties in a coarse model might not be calculated correctly. For example, when four cells are grouped with respective horizontal permeabilities (K) vertically into one cell as shown in FIG. 1, the two coarse cells will have average horizontal permeabilities equal to about 0.5, which results in horizontal fluid-flow between these two coarse cells. However, as shown in FIG. 1(a), there is obviously no fluid-flow between the left and the right cells. In this case, artificial connectivity was introduced by the upscaling process.

Figure 5:
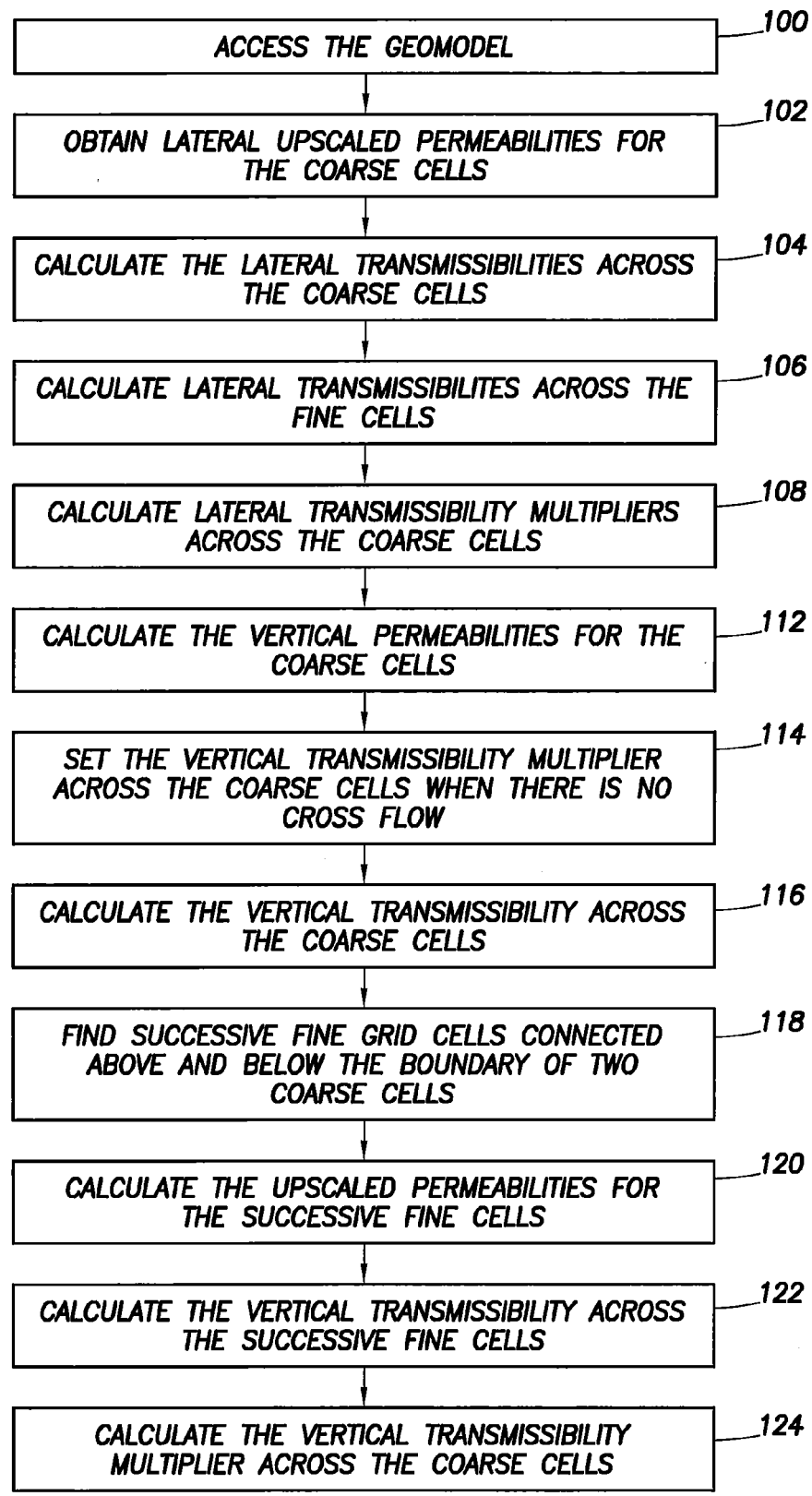
FIG. 5 is a flow diagram in accordance with an embodiment of the present invention.

A flowchart of steps that may be utilized by embodiments of the present invention is illustrated in FIG. 5. Some of the blocks of the flow chart may represent a code segment or other portion of the compute program. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved.

In step 100, a geomodel is accessed. The accessed geomodel is a three-dimensional model including a plurality of cells. In various embodiments, the geomodel may represent a subterranean volume. The cells within the geomodel are arranged on a three-dimension axis, x, y, and z such that each cell represents a predefined volume. The three-dimensional axis includes a lateral direction, encompassing the x-axis and the y-axis, and a vertical direction, including the z-axis. To date, there are numerous grid systems utilized in the petroleum industry, such as structured grids, totally unstructured grids or hybrid grids. Structured grids are grids whose topography is fixed; each inner vertex is incident to a fixed number of sides or edges. For example, Cartesian grids or corner-point grids. In an embodiment, a structured grid is utilized. However, the embodiment currently being described utilizes the Cartesian grid.

Each cell also includes at least one cell property, representing a feature of its corresponding volume. For example, the cell property may include rock type, porosity, permeability, water saturation, combinations thereof, and the like. Such geomodels are well known in the art and may be formed utilizing conventional methods.

In some embodiments, the geomodel is at least partially stored within a memory coupled with the computer, such that the geomodel may be accessed in step 100 by accessing the memory and retrieving data from there. The geomodel may also be retrieved from other computing devices or computer-readable memories through a communications network, such that the geomodel is not necessarily local to the computer or retained entirely on one computing device or computer-readable medium.

In step 102, the upscaled lateral permeabilities for each coarse cell along the x-axis and the y-axis are obtained. If the properties do not already exist, then the upscaled permeabilities will be calculated. In calculating the upscaled permeability for the coarse cells along the x-axis, the following relationship is utilized:

$$K_x^c = \frac{\sum_i f_i K_{x,i}^f}{\sum_i f_i} \tag{1}$$

where $K_x^c$ is the upscaled permeability along the x-axis; $f_i$ is the weighting function; and $K_{x,i}^f$ is the permeability in the fine cell i along the x-axis. In general the thickness can be used as the default weighting function. The superscript $c$ refers to property in the coarse scale model, and the superscript $f$ refers to property in the fine scale model.

Formula (1) is also utilized to calculate the upscaled permeability for the coarse cells along the y-axis by simply changing the subscript from x to y.

In step 104, the lateral transmissibilities across the coarse cells are calculated. For the transmissibility in the lateral direction (X/Y), the calculated upscaled permeabilities for the coarse cells are retrieved from step 102. As used herein, transmissibility refers to a measure of capacity of a given viscous fluid to move across a cell boundary (or inter-node connection) under pressure drop. More specifically, transmissibility is a measure of the ability of a fluid to flow between two neighboring cells within a porous medium.

Figure 6:
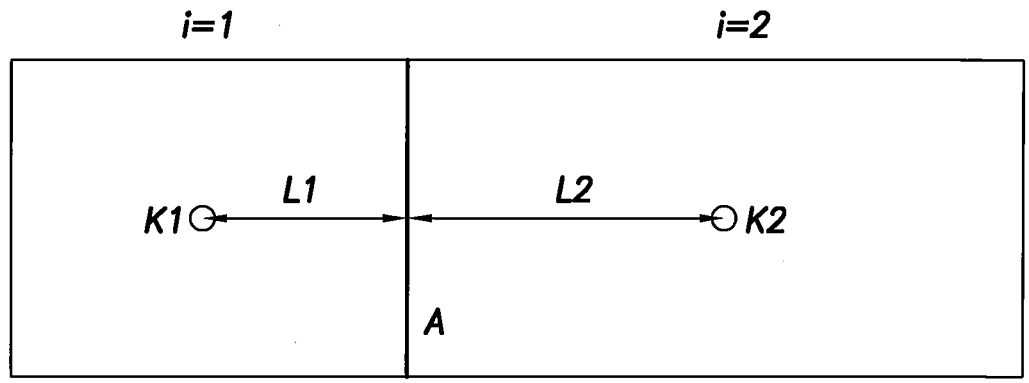
FIG. 6 is a schematic showing a transmissibility calculation between two neighboring cells in a Cartesian reservoir grid in accordance with an embodiment of the present invention.

Referring to FIG. 6, the horizontal transmissibility is calculated across the two cells along the x-axis. In calculating the horizontal transmissibility across the two cells along the x-axis, the following relationship is utilized:

$$T_x = \left(\frac{L_1}{NTG_1 \cdot K_{x,1} \cdot A} + \frac{L_2}{NTG_2 \cdot K_{x,2} \cdot A}\right)^{-1} \tag{2}$$

where $T_x$ is the horizontal transmissibility across the two cells along the x-axis; L is the horizontal length from the cell center to the cell edge; NTG is the net-to-gross ratio which represents the effective proportion of a cell treated as the reservoir element; and A is the contact area shared by the two cells. The transmissibility in the fine model along the x-axis is denoted as $T_x^f$ and the transmissibility in the coarse model along the x-axis is denoted as $T_x^c$.

Formula (2) is also utilized to calculate the transmissibility along the y-axis by simply changing the subscript from x to y. The transmissibility in the fine model along the y-axis is denoted as $T_y^f$ and the transmissibility in the coarse model along the y-axis is denoted as $T_y^c$.

In step 106, the total lateral transmissibilities across the fine cells along the coarse cell boundary is calculated. In calculating the total transmissibility across the fine scale along the x-axis, the following relationship is utilized:

$$T_x^{f,t} = \Sigma_k T_{x,k}^f \quad (3)$$

where $T_x^{f,t}$ is the total transmissibility across the fine scale along the x-axis and subscript k is the cell index along the z-axis.

In calculating the total transmissibility across the fine scale along the y-axis, the following relationship is utilized:

$$T_y^{f,t} = \Sigma_k T_{y,k}^f \quad (4)$$

where $T_y^{f,t}$ is the total transmissibility across the fine cells along the y-axis.

In step 108, the lateral transmissibility multipliers across the coarse cells are calculated. In calculating the transmissibility multiplier along the x-axis across the coarse cells, the following relationship is utilized:

$$m_x^c = \frac{T_x^{f,t}}{T_x^c} \quad (5)$$

where $m_x^c$ is the transmissibility multiplier across the coarse cells along the x-axis.

In calculating the transmissibility multiplier along the y-axis across the coarse cells, the following relationship is utilized:

$$m_y^c = \frac{T_y^{f,t}}{T_y^c} \quad (6)$$

where $m_y^c$ is the transmissibility multiplier across the coarse cells along the y-axis.

Figure 3A:
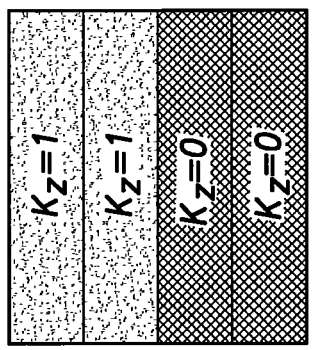
FIG. 3 is a schematic of vertical permeabilities in fine cells in a Cartesian reservoir grid (plot a) and in the corresponding upscaled coarse cell (plot b) in accordance with an embodiment of the present invention.
Figure 3B:
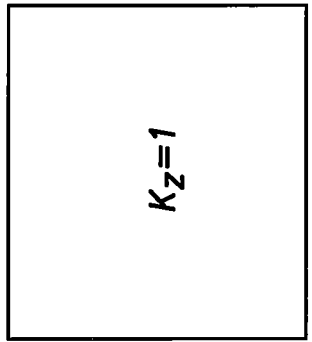

In step 112, the upscaled vertical permeability for each coarse cell is calculated. For vertical permeability upscaling, applying harmonic averaging over all the vertical permeabilities of the fine cells is a known method. However, the presence of one zero vertical permeability in the fine cells makes the upscaled vertical permeability zero. In order to combat this deficiency, the following formulation applied to average only the non-zero thickness and non-zero permeability cells is utilized:

$$K_z^c = \frac{\sum_{h \neq 0, K_z^f \neq 0} h}{\sum_{h \neq 0, K_z^f \neq 0} h/K_z^f} \quad (7)$$

where $K_z^c$ is the upscaled vertical permeability at the coarse cells; h is the cell thickness; $K_z^f$ is the vertical permeability at the fine cells. For example, the coarse cell in FIG. 3(b) has vertical permeability of 1.0, instead of zero.

Figure 4A:
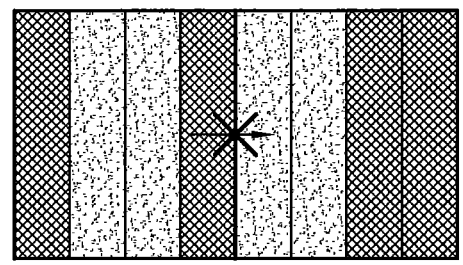
FIG. 4 is a schematic showing vertical cell communication of no cross-flow (plot a) and with cross flow (plot b) in a Cartesian reservoir grid in accordance with an embodiment of the present invention.
Figure 4B:
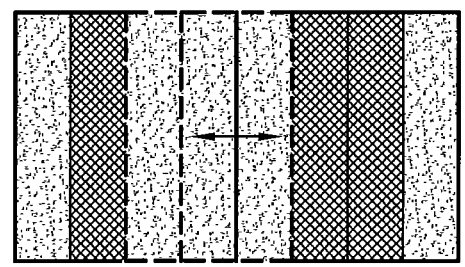

In step 114, the vertical transmissibility multiplier across the coarse cells is determined. During upscaling, if there is a fine cell with zero permeability along the boundary of two coarse cells, as shown in FIG. 4(a), the transmissibility multiplier along the z-axis would be $m_z^c=0$. If there is no fine cell with zero permeability along the coarse cell boundary, as shown in FIG. 4(b), the transmissibility $T_z^c$ across the coarse cells is calculated in step 116.

In step 116, the vertical transmissibility $T_z^c$ across two coarse cells using the upscaled permeabilities $K_z^c$ from step 112 is calculated with the following relationship:

$$T_z^c = \left(\frac{h_1}{K_{z,1}^c \cdot A} + \frac{h_2}{K_{z,2}^c \cdot A}\right)^{-1} \quad (8)$$

where $T_z^c$ is the vertical transmissibility across the two coarse cells along the z-axis; h is the half cell thickness; and A is the contact area shared by the two cells; and the superscript c denotes the coarse grid.

In step 118, successive fine cells with non-zero vertical permeabilites connected above and below the boundary of two coarse cells are found, and those successive fine cells form one coarse block above and one coarse block below that boundary. The zero thickness cells should be treated as the connected cells, and these cells should be skipped during searching until the next valid cell is found.

In step 120, the upscaled vertical permeabilities $K_z^{c,b}$ of the two newly-formed blocks are calculated. The upscaled vertical permeability $K_z^{c,b}$ is calculated using only the successive fine cells for each coarse cell identified in step 118. The calculation can use all the successive cells, or just one cell, above and below the boundary.

In step 122, the vertical transmissibility $T_z^f$ across the coarse blocks created by the successive fines cells identified in step 120 is calculated. The vertical transmissibility across the coarse cells is calculated using formula (8) with the block permeability $K_z^{c,b}$ and block thickness.

In step 124, the vertical transmissibility multiplier across the coarse cells is calculated using the vertical transmissibility from step 116 and the vertical transmissibility from step 122. The transmissibility multiplier is calculated using the following relationship:

$$m_z^c = \frac{T_z^{f^c}}{T_{z_z}^c} \quad (9)$$

where $m_z^c$ is the transmissibility multiplier along the z-axis across the coarse cells.

Figure 7:
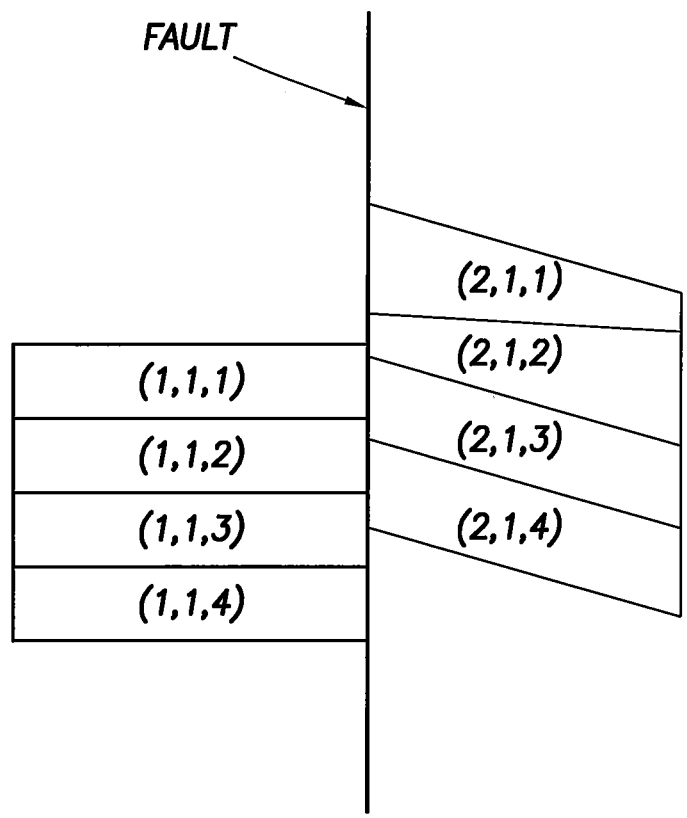
FIG. 7 is a schematic showing the cells along the fault interface in a corner point geometry grid in accordance with an embodiment of the present invention.

As previously discussed, the reservoir upscaling method is not limited to the Cartesian grid. In an embodiment, the reservoir upscaling method can be applied to a corner-point geometry grid. FIG. 7 demonstrates a cell connection along the fault interface in a corner-point geometry grid. Cell (1,1,1) is connected to cell (2,1,2) and cell (2,1,3), because they share some common contact area. This type of cell connection is commonly known as "non-neighbor connection" (NNC). For both applications in the Cartesian grid and the corner-point geometry grid, it is not necessary for the cells to have the same cell thickness or volume.

For a grid with corner-point geometry, the method for calculating the vertical permeability and the vertical transmissibility multiplier is the same as in the Cartesian grid. When the four cells are upscaled along either side of the fault as shown in FIG. 7 into two coarse cells, for example grouping cells (1,1,1), (1,1,2) and (1,1,3) into one coarse cell (c1) and leave cell (1,1,4) as another coarse cell (c2), then the vertical transmissibility multiplier across the coarse cells (c1) and (c2) can be calculated using the exact same method for the Cartesian grid, because there is no NNC in the vertical direction. However, cell thickness must be used throughout the upscaling process.

For the calculation of horizontal permeability and the horizontal transmissibility multiplier, an additional step is required to identify NNC across the fault surface. For example, the NNC between cells (1,1,1) and (2,1,2), and between cells (1,1,1) and (2,1,3) in FIG. 7 must be determined. Various methods are known in the art to determine NNC cells and to calculate the transmissibility for the NNC cells. The horizontal transmissibility multiplier can then be determined using the method provided in the Cartesian grid.

The calculated transmissibility multiplier in both horizontal and vertical directions can be used as key parameters to evaluate the accuracy of an upscaled geologic model. If the upscaling method is appropriate, majority of the transmissibility multiplier values should be equal to one or close thereto. However, if the transmissibility multiplier significantly departs from a value being equal to one or close thereto, then the upscaling model must be revised by using a different weighting function or a different lumping scheme. Transmissibility multipliers become useful if the upscaled model deems to be appropriate.

Figure 8:
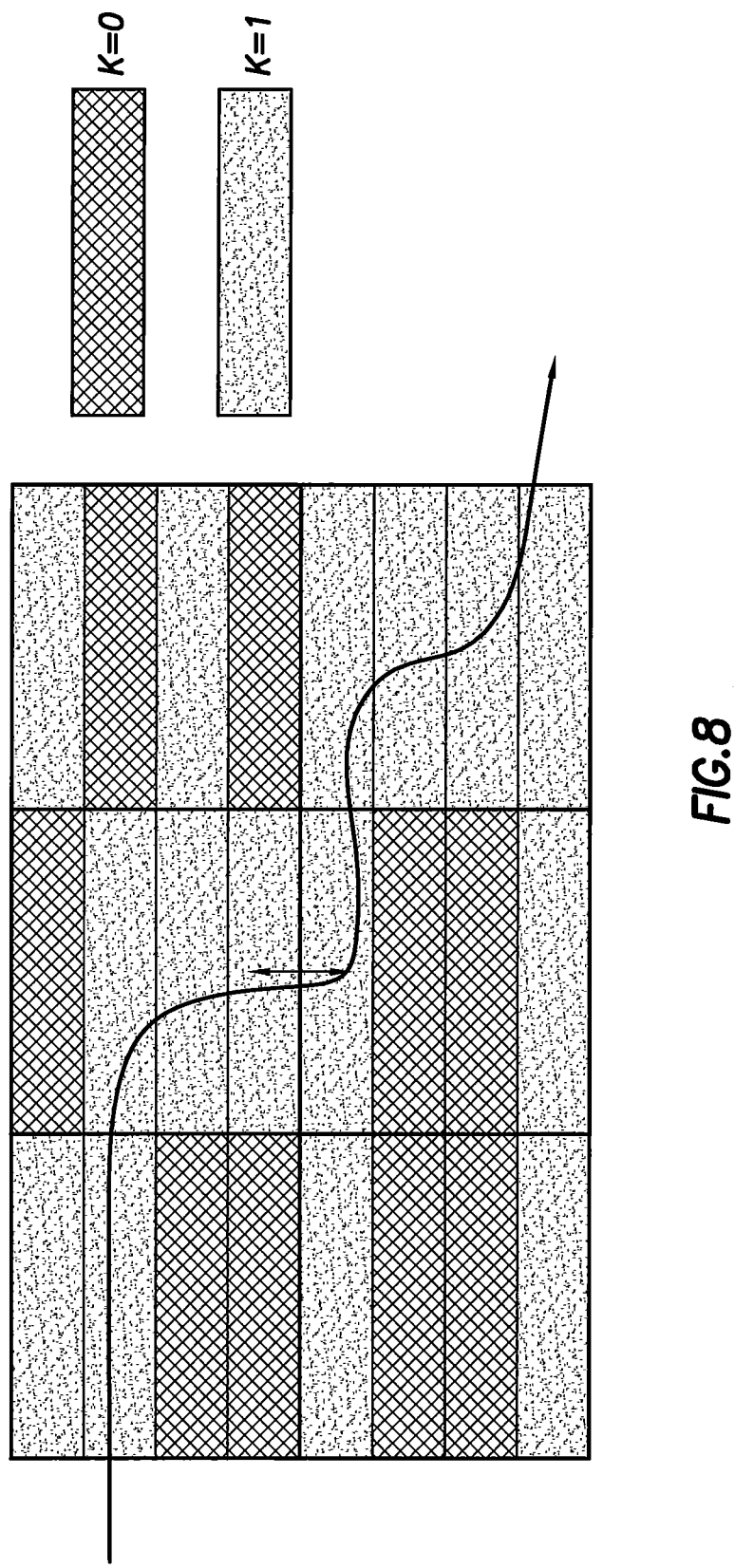
FIG. 8 is a schematic showing the detoured flow path in accordance with an embodiment of the present invention.

In the traditional vertical permeability upscaling methods, any zero vertical permeability in a fine cell would eliminate flow in the vertical direction and therefore cannot preserve the complex paths observed in the fine grid. This invention provides the methods to post-processing the upscaled geologic model created by any upscaling techniques. This invention uses the horizontal permeability in the coarse grid and leaves it unchanged. However, the vertical permeability in the coarse grid will be re-calculated. The method for calculating the upscaled vertical permeability preserves the detoured flow paths from the fine grid. In FIG. 8, the flow path from the up-left to the low-right will be preserved.

Methods consistent with the present teachings are especially well-suited for implementation by a computing element. The computer may be a part of a computer network that includes one or more client computers and one or more server computers interconnected via a communications system such as an intranet or the interne. It will be appreciated, however, that the principles of the present invention are useful independently of a particular implementation, and that one or more of the steps described herein may be implemented without the assistance of the computing device or with the assistance of a plurality of computing devices.

The present invention can be implemented in hardware, software, firmware, and/or a combination thereof. In a preferred embodiment, however, the invention is implemented with a computer program. The computer program and equipment described herein are merely examples of a program and equipment that may be used to implement the present invention and may be replaced with other software and computing devices without departing from the scope of the present teachings.

Computer programs consistent with the present teachings can be stored in or on a computer-readable medium residing on or accessible by the computer for instructing the computer to implement methods as described herein. The computer program preferably comprises a plurality of code segments corresponding to executable instructions for implementing logical functions in the computer and other computing devices coupled with the computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

It will be understood by persons of ordinary skill in the art that the program may comprise a single list of executable instructions or two or more separate lists, and may be stored on a single computer-readable medium or multiple distinct media.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described in the present invention. It is the intent of the inventors that variations and equivalents of the invention are within the scope of the claims below and the description, abstract and drawings not to be used to limit the scope of the invention.

The invention claimed is:

1. A computer-implemented method of characterizing or modeling a reservoir, the method comprising:
   a. determining an upscaled permeability along an x-axis for coarse cells;
   b. calculating by a processor a transmissibility along the x-axis for the coarse cells;
   c. calculating the transmissibility along the x-axis for fine cells;
   d. calculating transmissibility multipliers along the x-axis across the coarse cells, wherein each transmissibility multiplier along the x-axis is calculated by dividing the transmissibility along the x-axis across the fine cells by the transmissibility along the x-axis across the coarse cells;
   e. determining an upscaled permeability along a y-axis for the coarse cells;
   f. calculating the transmissibility along the y-axis for the coarse cells;
   g. calculating the transmissibility along the y-axis across the fine cells;
   h. calculating the transmissibility multipliers along the y-axis across the coarse cells, wherein each transmissibility multiplier along the y-axis is calculated by dividing the transmissibility along the y-axis across the fine cells by the transmissibility along the y-axis across the coarse cells;

i. calculating the upscaled permeability properties along a z-axis for the coarse cells, wherein each permeability along the z-axis across the coarse cells is calculated by applying a harmonic averaging over non-zero permeability cells, wherein harmonic averaged permeability is calculated by dividing summation of a non-zero thickness by the non-zero permeability along the z-axis across the fine cells;

j. monitoring the transmissibility multiplier along the z-axis across the coarse cells, wherein presence of a zero permeability value in the fine cell on either side of a boundary of the coarse cells results in a zero transmissibility multiplier along the z-axis across the boundary;

k. calculating a transmissibility along the z-axis across the coarse cells, wherein the transmissibility along the z-axis across the coarse cells is calculated by utilizing the upscaled permeabilities from step (i);

l. identifying successive fine cells connected above and below the boundary shared by two successive coarse cells;

m. calculating the upscaled permeability along the z-axis for the coarse blocks identified in step (l);

n. calculating the transmissibility along the z-axis across the coarse cells using the upscaled permeability calculated in step (m); and o. calculating the transmissibility multiplier along the z-axis across the coarse cells.

2. The method according to claim 1, wherein to preserve a detoured flow path, vertical permeability and post-processing transmissibility are recalculated.

3. The method according to claim 1, wherein the method is applied to a Cartesian grid.

4. The method according to claim 1, wherein the method is applied to a corner-point grid.

* * * * *